(12) United States Patent
Munoz et al.

(10) Patent No.: US 11,338,649 B2
(45) Date of Patent: May 24, 2022

(54) AIR VENT FOR A VEHICLE

(71) Applicant: GM GLOBAL TECHNOLOGY OPERATIONS LLC, Detroit, MI (US)

(72) Inventors: Angel R. Munoz, Rochester Hills, MI (US); Steven J. Leathorn, Fort Gratiot, MI (US); Olivier Poulet, Royal Oak, MI (US); Keunhyuk Choi, Troy, MI (US); Harish Kumar, Troy, MI (US); Colin L. Kuzniar, Rochester Hills, MI (US); Roman Szocinski, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 161 days.

(21) Appl. No.: 16/847,812

(22) Filed: Apr. 14, 2020

(65) Prior Publication Data
US 2021/0316599 A1    Oct. 14, 2021

(51) Int. Cl.
*B60H 1/34* (2006.01)

(52) U.S. Cl.
CPC ... *B60H 1/3428* (2013.01); *B60H 2001/3471* (2013.01)

(58) Field of Classification Search
CPC ...... B60H 1/34; B60H 1/3414; B60H 1/3421; B60H 1/3428; B60H 2001/3471; B60H 2001/3478
USPC .......................................................... 454/155
See application file for complete search history.

(56) References Cited

U.S. PATENT DOCUMENTS

| | | | |
|---|---|---|---|
| 2014/0364045 A1* | 12/2014 | Noichl | F24F 13/1426 454/155 |
| 2016/0288624 A1* | 10/2016 | Albin | B60H 1/3421 |
| 2020/0130475 A1* | 4/2020 | Kulicki | B60H 1/3421 |
| 2020/0317030 A1* | 10/2020 | Oh | B60H 1/3421 |

FOREIGN PATENT DOCUMENTS

| | | | | |
|---|---|---|---|---|
| CN | 109649125 A | * | 4/2019 | ........... B60H 1/3421 |
| DE | 102011056079 A1 | | 6/2013 | |
| DE | 102018127505 A1 | * | 5/2020 | ........... B60H 1/3421 |
| DE | 102018127505 A1 | | 5/2020 | |
| DE | 102019109161 A1 | * | 10/2020 | ........... B60H 1/3421 |
| DE | 102019109161 A1 | | 10/2020 | |
| FR | 2809349 A1 | * | 11/2001 | ........... B60H 1/3421 |

OTHER PUBLICATIONS

Machine Translation of Caodoro (Year: 2001).*
Machine Translation of Li (Year: 2019).*
Machine Translation of Endres (Year: 2020).*
Machine Translation of Endres (DE 102019109161 A1) (Year: 2020).*

* cited by examiner

*Primary Examiner* — Steven S Anderson, II
*Assistant Examiner* — Phillip Decker
(74) *Attorney, Agent, or Firm* — Vivacqua Crane PLLC (57) ABSTRACT

A vehicle air vent includes a volume control door pivotally mounted in a housing, a primary vane pivotally mounted in the housing to direct an air flow from an outlet of the vehicle air vent in an up/down direction, and a roller knob mounted on the primary vane and connected to the volume control door such that a rotation of the roller knob causes a rotation of the volume control door.

13 Claims, 10 Drawing Sheets

AIR VENT FOR A VEHICLE

FIELD

The present disclosure relates to an air vent for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Modern passenger vehicles include a heating, ventilation, and air conditioning (HVAC) system that allows a vehicle occupant to control the temperature or adjust other settings of a vehicle interior. For instance, a motor-driven fan or blower circulates conditioned air to the vehicle interior through air vents. Some vehicles are equipped with heated and/or cooled seats, a heated steering wheel, and other features that collectively improve the overall drive experience. HVAC systems may include front and rear defrosters for improving visibility through the windshield and rear window, respectively. An occupant of the vehicle selects desired HVAC system settings using dials, knobs, push-buttons, and/or touch screens.

Air vents for vehicles are typically integrated into instrument panels which are increasingly limited in the amount of space that is available in the instrument panel and the locations in the instrument panel which are available for the air vents to be positioned. Additionally, a vehicle air vent needs to be integrated into an instrument panel in a manner which is aesthetically pleasing to the vehicle occupants. In order to improve the aesthetics, vehicle designers may desire that the air vents seamlessly integrate with other elements in the instrument panel. For example, in a design aesthetic theme which emphasizes a single element horizontally across the instrument panel, any element which fails to follow this theme and/or which interrupts this horizontal element is undesirable. Further, in order to reduce cost and to improve the simplicity of operation and design, it is desirable to provide a single control element for an air vent which not only controls the up/down and side to side direction of air flow from the air vent, but which also provides control over the volume of flow from each, individual air vent.

SUMMARY

In an exemplary aspect, a vehicle air vent includes a volume control door pivotally mounted in a housing, a primary vane pivotally mounted in the housing to direct an air flow from an outlet of the vehicle air vent in an up/down direction, and a roller knob mounted on the primary vane and connected to the volume control door such that a rotation of the roller knob causes a rotation of the volume control door.

In another exemplary aspect, the roller knob is rotatable independently of the primary vane.

In another exemplary aspect, the volume control door is connected to a first gear shaft which includes a first set of gear teeth that engage a second set of gear teeth on a second gear shaft.

In another exemplary aspect, the second gear shaft connects to a pivot shaft that extends into the primary vane and connects to the roller knob.

In another exemplary aspect, the pivot shaft is a flexible pivot shaft.

In another exemplary aspect, a first end of the pivot shaft rotates about a first axis and a second end of the pivot shaft rotates about a second axis that is offset from the first axis.

In another exemplary aspect, the roller knob is rotatable about the second axis.

In another exemplary aspect, the second axis is offset further away from the volume control door than the first axis.

In another exemplary aspect, the primary vane is pivotally mounted to rotate about the first axis.

In another exemplary aspect, the roller knob includes a first sleeve rotatable about a first axis, a second sleeve rotatable about a second axis that is offset from the first axis, and a belt extending around each of the first sleeve and the second sleeve.

In another exemplary aspect, the vent further includes a plurality of secondary vanes pivotal about a vertical axis to direct an air flow from an outlet of the vehicle air vent in a side-to-side direction, a slider knob slidably mounted on the primary vane, and a slider fork connected to the slider knob and engaging the plurality of secondary vanes, and the roller knob is connected to the slider knob to slide in a side-to-side direction together with the slider knob on the primary vane.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Figure 1:
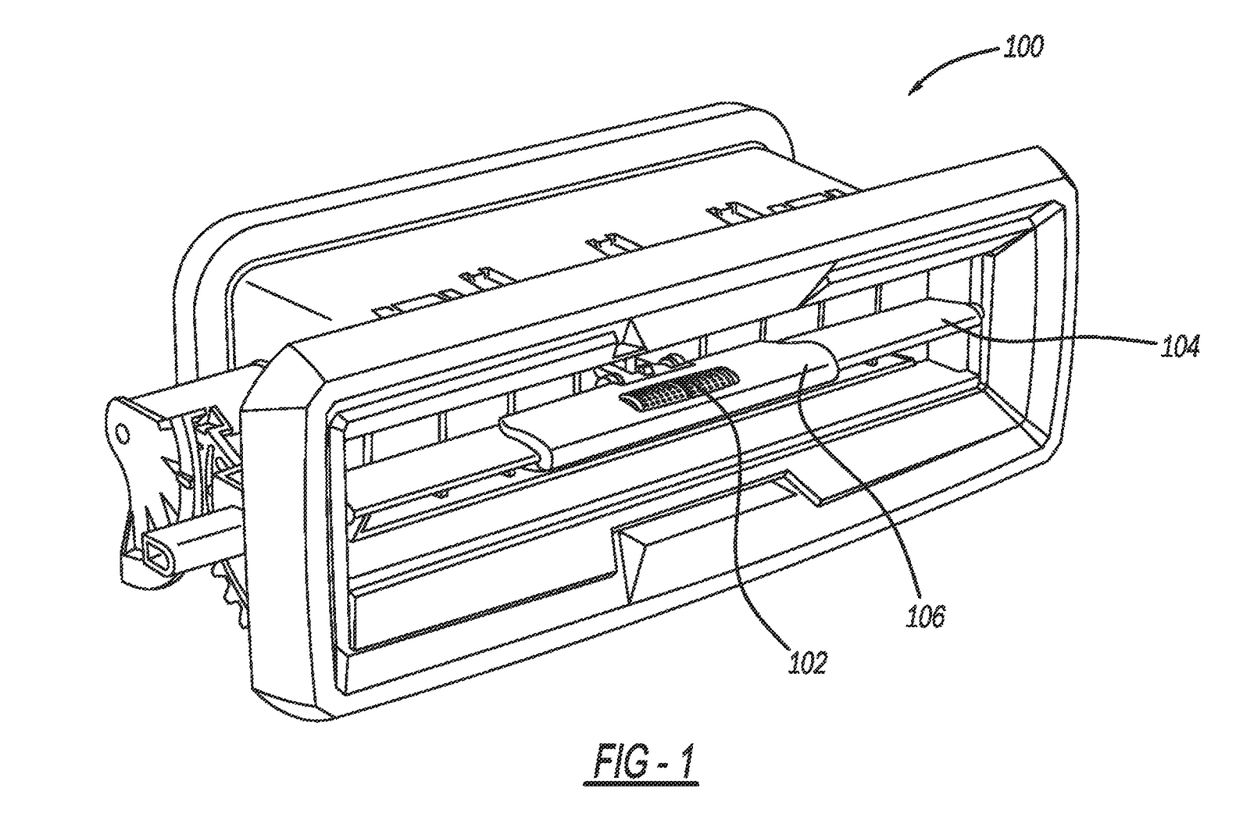
FIG. 1 is a perspective view of an air vent incorporating an air flow volume control with a slider roller knob in accordance with an exemplary embodiment of the present disclosure.

Referring now to the drawings, wherein like reference numbers correspond to like or similar components throughout the several figures, FIG. 1 is a perspective view of an air vent 100 incorporating an air flow volume control with a roller knob 102 in accordance with an exemplary embodiment of the present disclosure. The air vent 100 includes a primary vane 104 having a slider knob 106 on which the roller knob 102 is mounted. Movement of the slider knob 106 in an up or down direction results in a corresponding upward or downward rotation of the primary vane 104 which causes the air flow exiting the air vent 100 to move in a corresponding up or down direction. Further, as will be described in more detail below, the slider knob 106 is slidable in a side to side direction on the primary vane 104 in order to control the side to side direction of the air flow exiting the air vent 100. Additionally, in accordance with the present disclosure, the roller knob 102 is rotatable in order to control the volume of air flow exiting the vent 100.

Figure 2A:
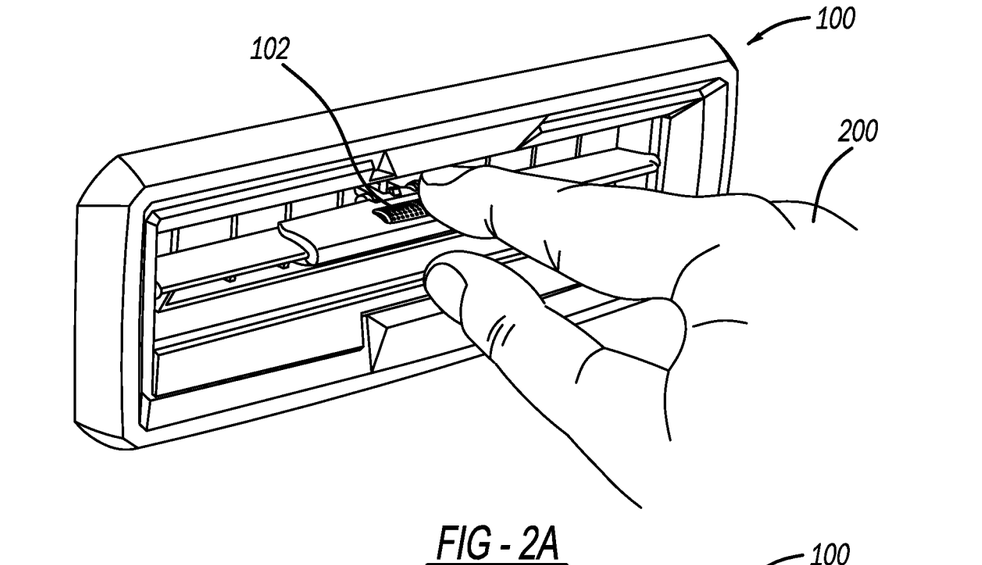
FIG. 2A is a perspective view of the exemplary air vent of FIG. 1.
Figure 2B:
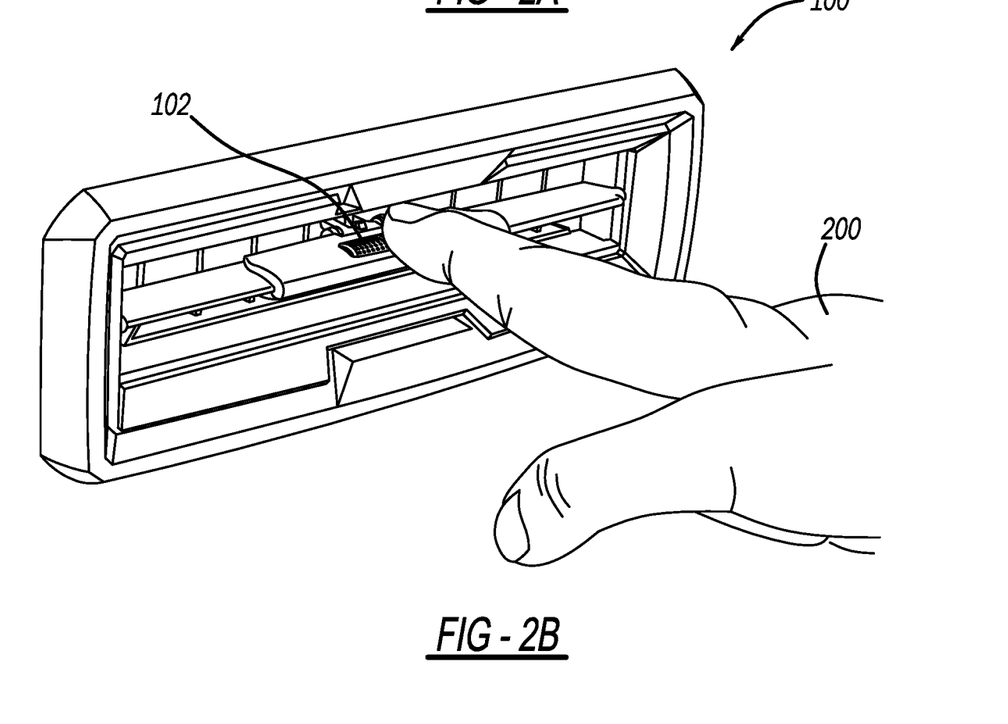
FIG. 2B is another perspective view of the exemplary air vent of FIG. 1.

FIGS. 2A and 2B provide perspective views of the exemplary air vent 100 which illustrate how a user 200 may interact with the air vent 100 to control the volume of air exiting the air vent 100. In FIG. 2A, the user 200 may pinch the roller knob 102 between their fingers and cause the roller knob 102 to rotate in order to control the volume of air exiting the air vent 100. In FIG. 2B, the user 200 may rest a finger onto the roller knob 102 and move the finger into and/or out of the air vent 100 to cause the roller knob 102 to rotate which controls the volume of air flow exiting the air vent 100.

Figure 3:
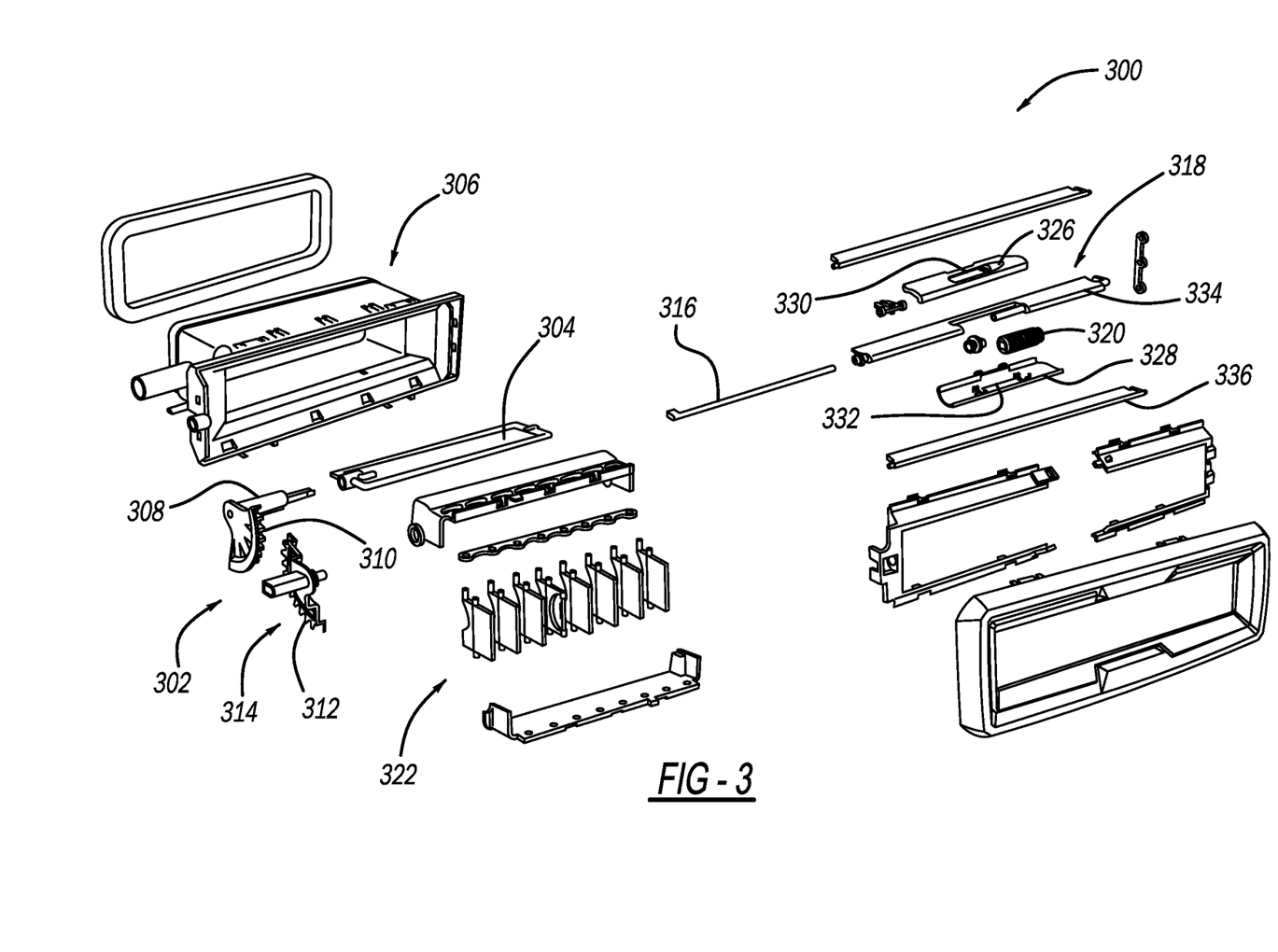
FIG. 3 is an exploded perspective view of an exemplary air vent in accordance with the present disclosure.
Figure 4:
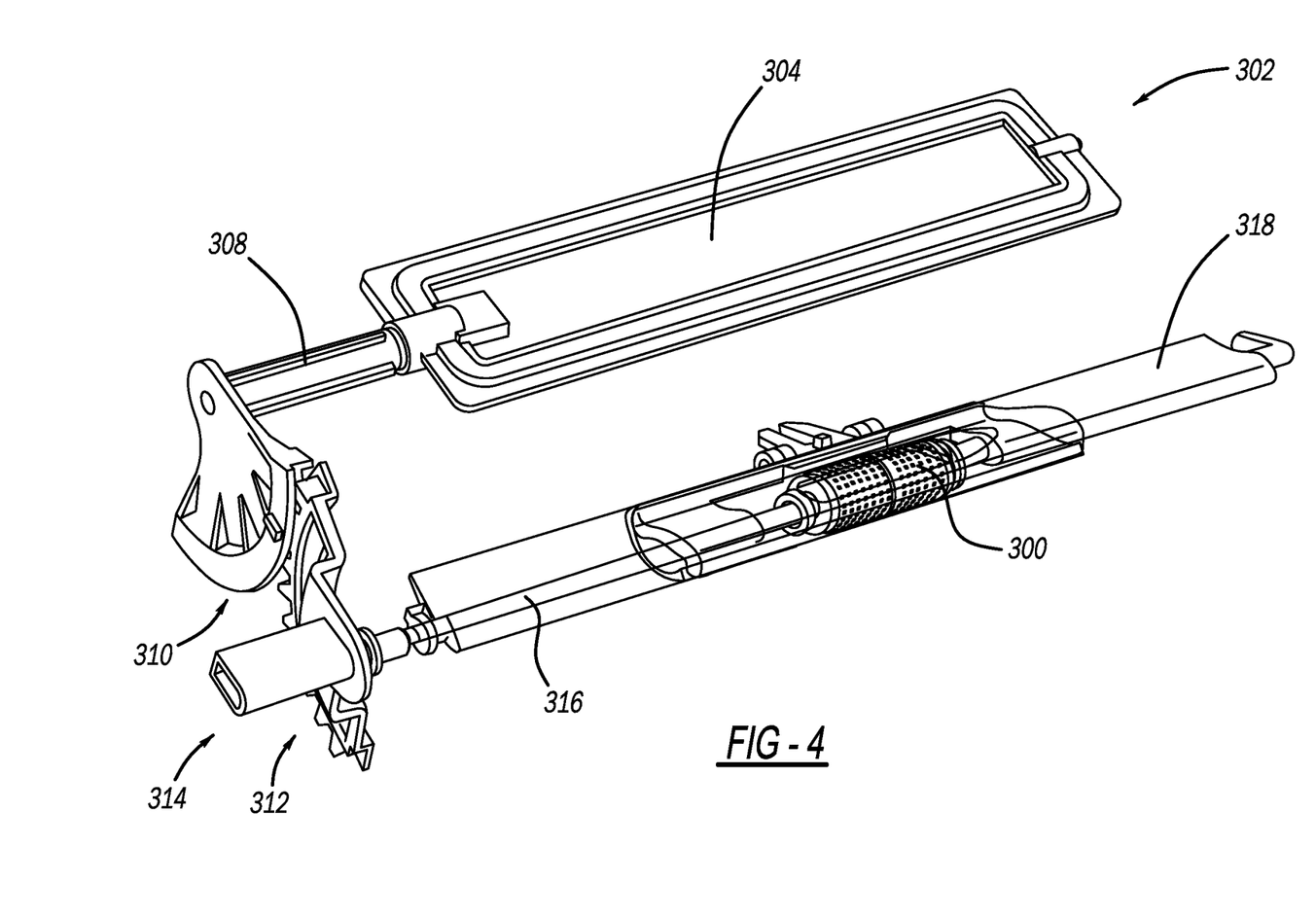
FIG. 4 is a perspective view of an air vent volume control system for the air vent of FIG. 3.

FIG. 3 is an exploded view of an air vent 300 incorporating an air vent volume control system 302 in accordance with the present disclosure. FIG. 4 illustrates a perspective view of the air vent volume control system 302 in isolation from the remainder of the air vent 300 for purpose of clarity. The air vent volume control system 302 includes a volume control door 304 that is pivotally mounted within an air vent housing 306. The volume control door 304 is connected to a first gear shaft 308. The first gear shaft 308 includes a set of first gear teeth 310 which engage a corresponding set of second gear teeth 312 on a second gear shaft 314. The second gear shaft 314 engages a first pivot shaft 316. The air vent 300 includes a primary vane 318 that is pivotally mounted to the air vent housing 306 and the first pivot shaft 316 extends into the primary vane 318 to connect to a roller knob 320. The roller knob 320 is independently rotatable relative to the primary vane 318. Rotation of the roller knob 320 causes a corresponding rotation of the second gear shaft 314 (via the first pivot shaft 316) and the engagement of the set of second gear teeth 312 with the set of first gear teeth 310, in turn, causes rotation of the first gear shaft 308 which then causes the volume control door 304 to rotate. In this manner, rotation of the roller knob 320 provides control over the volume of air flowing through the air vent 300 independently of the operation of the primary vane 318 or other elements of the air vent 300.

Figure 5A:
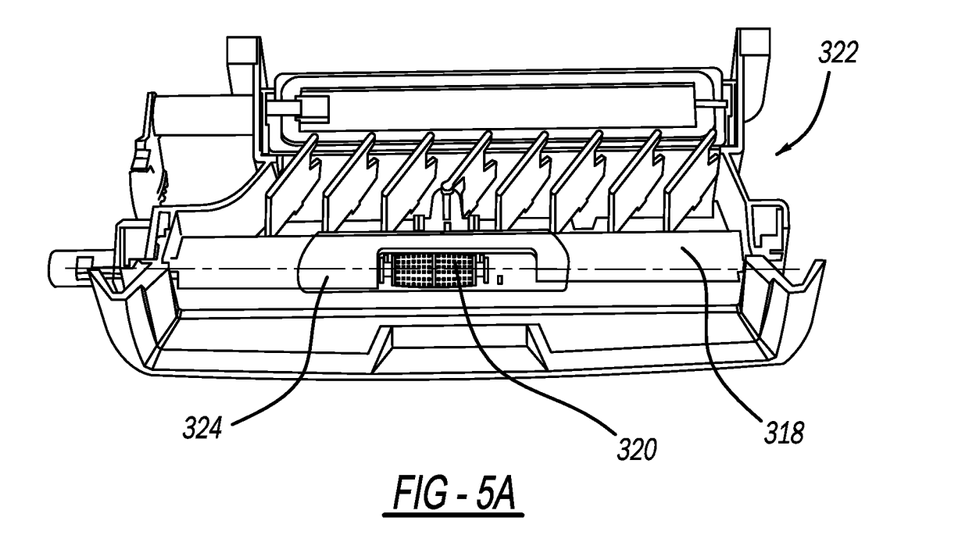
FIG. 5A is a cross-sectional plan view of the air vent of FIG. 3 in a first secondary vent configuration.
Figure 5B:
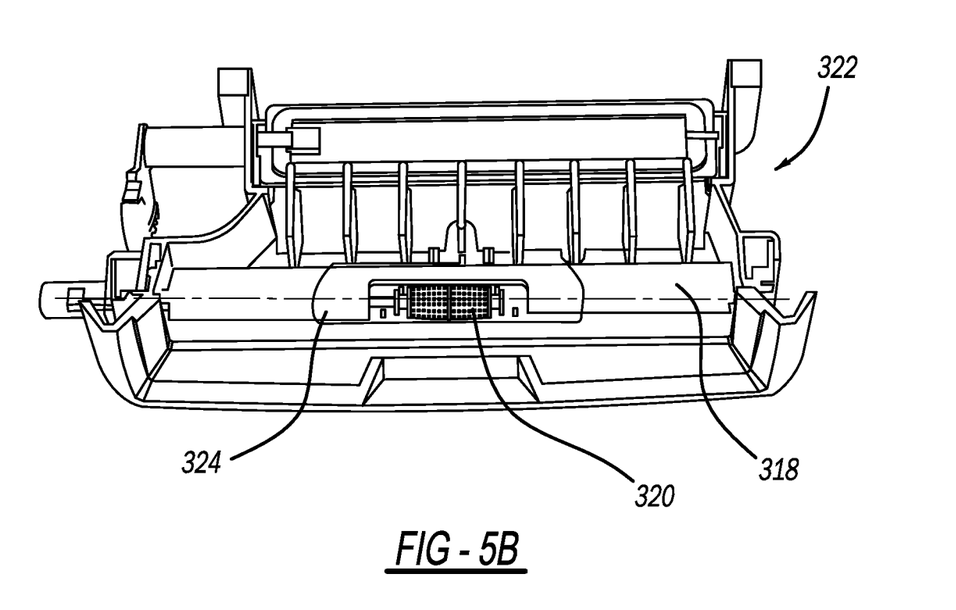
FIG. 5B is a cross-sectional plan view of the air vent of FIG. 3 in a second secondary vent configuration.
Figure 5C:
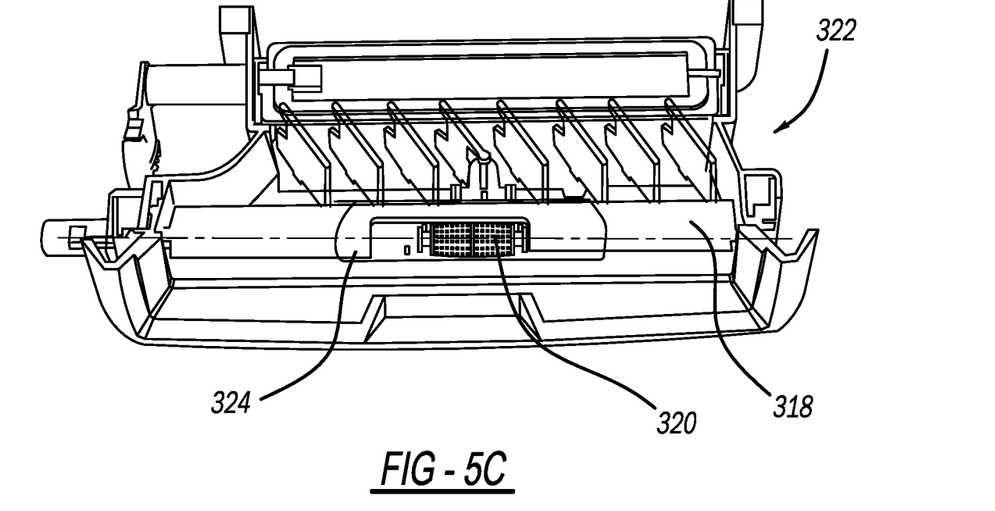
FIG. 5C is a cross-sectional plan view of the air vent of FIG. 3 in a third secondary vent configuration.

FIGS. 5A-5C provide cross-sectional plan views of the air vent 300 illustrating operation of a plurality of secondary vanes 322 to control the direction of air flowing from the air vent 300 in a side-to-side direction. The air vent 300 includes a slider knob 324 that is slidably mounted on the primary vane 318. As illustrated in FIG. 3, the slider knob 324 includes an upper slider portion 326 and a lower slider portion 328 which connect to each other around a portion of the primary vane 318 (see FIG. 3). The upper slider portion 326 defines an upper opening 330 and the lower slider portion 328 defines a lower opening 332 which provides access to the roller knob 320. The slider knob 324 is connected to a slider fork 330 which is connected to the plurality of secondary vanes 322. In this manner, as shown in FIG. 5A, movement of the slider knob 324 to the left causes the plurality of secondary vanes 322 to pivot to the left which causes air flowing from the air vent to be directed to the left. As shown in FIG. 5B, centering of the slider knob 324 centers the plurality of secondary vanes 322 which causes air flowing from the air vent to be directed straight through the air vent. Similarly, as shown in FIG. 5C, movement of the slider knob 324 to the right causes the plurality of secondary vanes 322 to pivot to the right which causes air flowing from the air vent to be directed to the right. As is clearly illustrated in FIGS. 5A-5C, the roller knob 320 moves in a side-to-side direction with the slider knob 324.

Figure 6A:
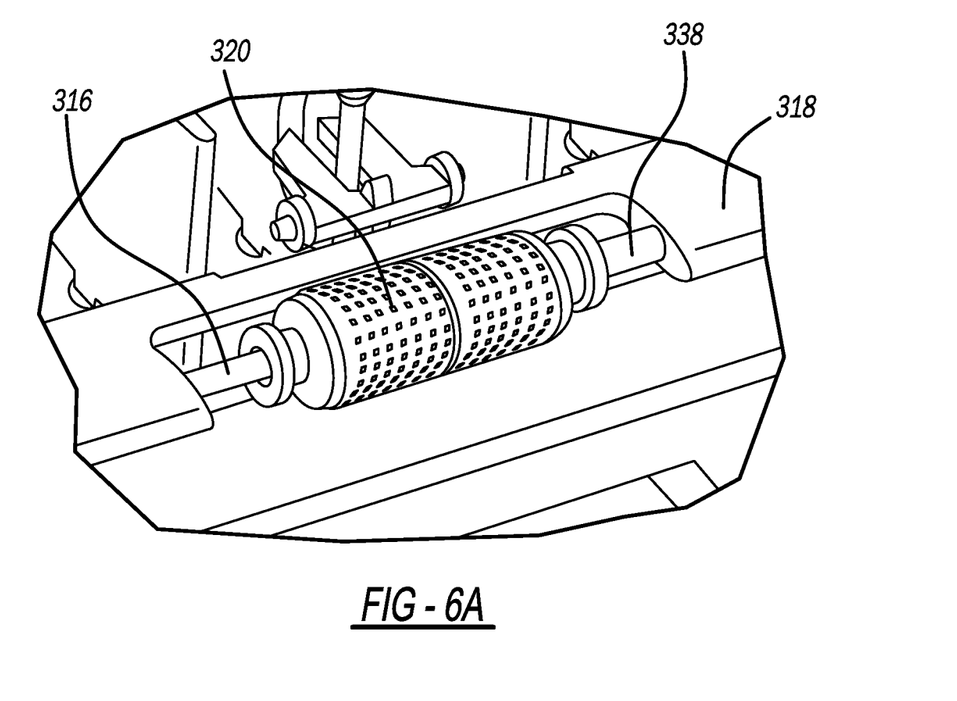
FIG. 6A is a close-up perspective view of a portion of the air vent of FIG. 3.
Figure 6B:
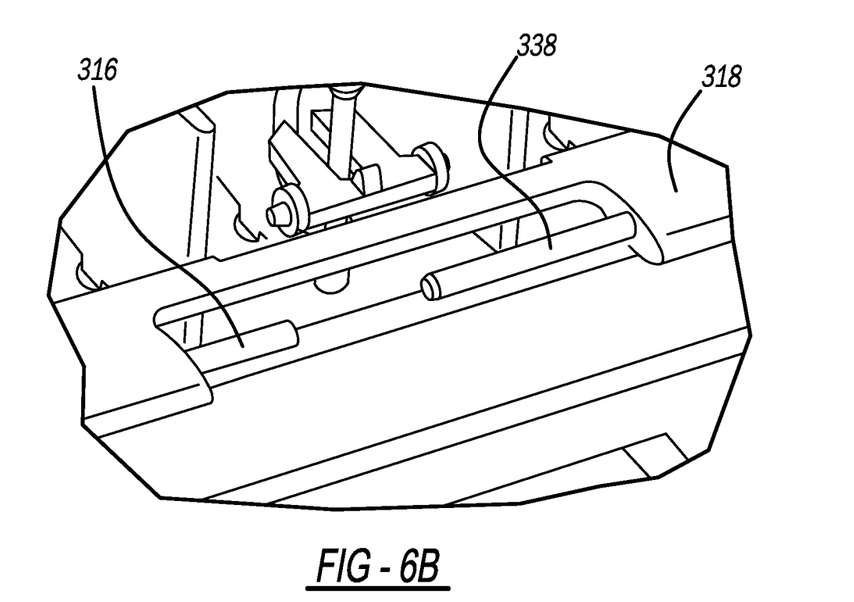
FIG. 6B is another close-up perspective view of a portion of the air vent of FIG. 3.
Figure 6C:
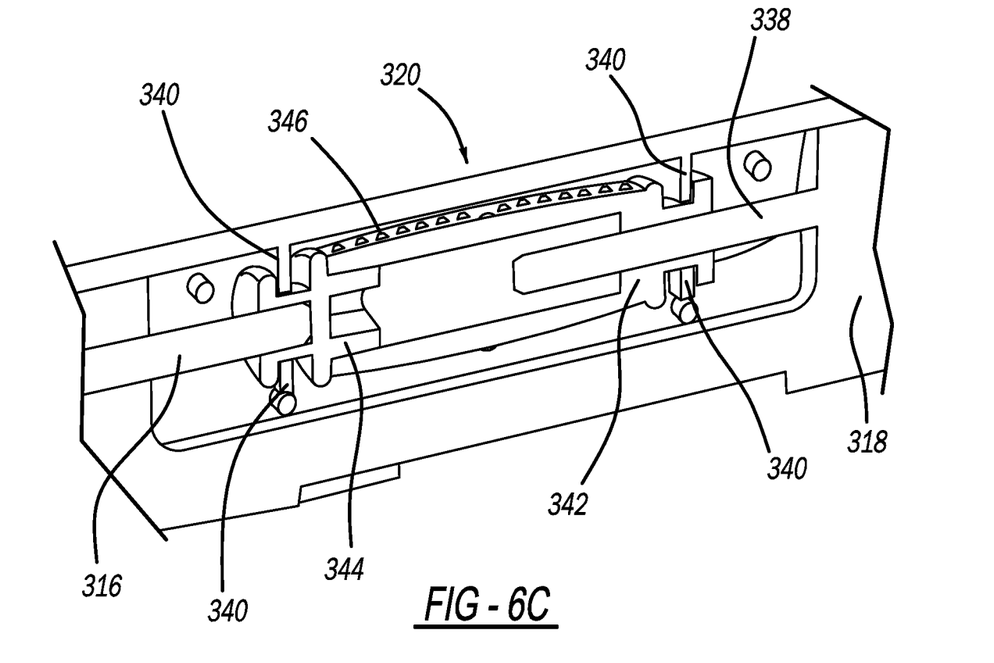
FIG. 6C is a cross-sectional, close-up view of the air vent of FIG. 3.
Figures 7, 8:
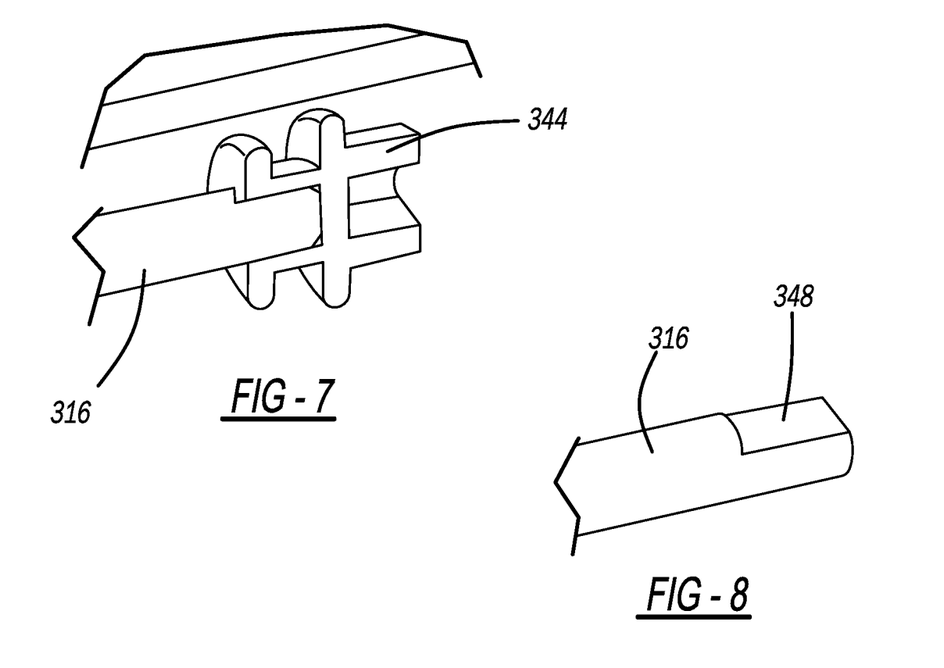
FIG. 7 is a close-up, cross-sectional view of a portion of the air vent of FIG. 3.
FIG. 8 is a partial perspective view of first pivot shaft.
Figure 9:
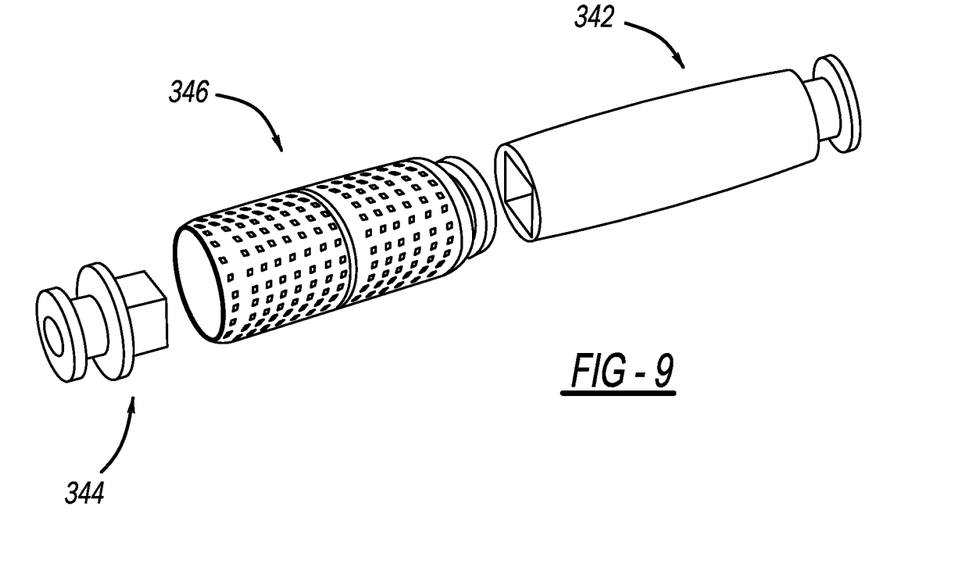
FIG. 9 is an exploded perspective view of an exemplary roller knob.

FIGS. 6A and 6B provide close-up perspective views of a portion of the air vent 300 in accordance with an exemplary embodiment of the present disclosure. Select components of the air vent 300 are not illustrated for purposes of clarity. The primary vane 318 includes an upper primary portion 334 and a lower primary portion 336 (see FIG. 3). The upper primary portion 334 includes a primary shaft 338 on which the roller knob 320 is rotatably mounted. The first pivot shaft 316 extends through the other side of the primary vane 318 and is connected to the roller knob 320. The first pivot shaft 316 is also rotatably mounted to the primary vane 318 such that the first pivot shaft 316, together with the roller knob 320, may rotate independently of the primary vane 318. FIG. 6C is a cross-sectional, close-up view of the air vent 300. Each of the upper slider portion 326 and the lower slider portion 328 include arms 340 which are positioned on each side of the roller knob 320 to enable the roller knob 320 to move in a side-to-side motion together with the slider knob 324. The roller knob 320 includes a roller core 342, a roller hub 344, and a roller over-mold portion 346 (see also FIGS. 7-9). The roller core 342 engages a pair of the arms 340 on one side of the roller knob 320 and the roller hub 344 engages the other pair of arms 340 on the other side of the roller knob 320. The roller hub 344 is attached to one end of the first pivot shaft 316 which includes a key 348 to ensure that the roller hub 344 (and the entire roller knob 320) rotate together with the first pivot shaft 316.

Figure 10:
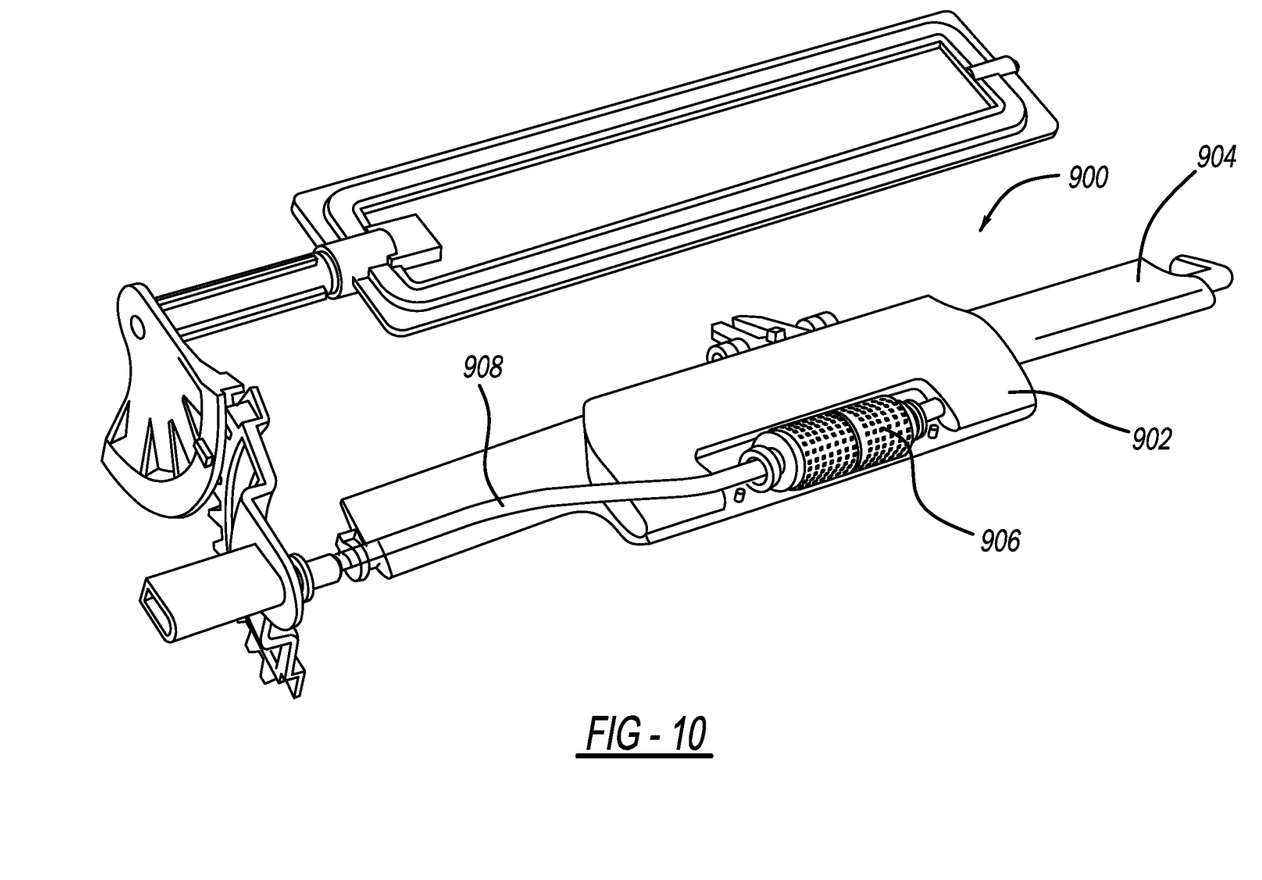
FIG. 10 is a partial perspective view of another exemplary air vent volume control system in accordance with the present disclosure.

FIG. 10 is a perspective view of another exemplary air volume control system 900 in accordance with the present invention. The air volume control system 900 is substantially the same as the air volume control system 302 with the following differences. The slider knob 902 extends forward from primary vane 904. In this manner, a user's fingers are not required to fit into the gap between the primary vane and the air vent bezel/housing that surrounds the primary vane as illustrated in FIGS. 2A and 2B. The roller knob 906 of this exemplary embodiment connects to a flexible pivot shaft 908.

Figure 11:
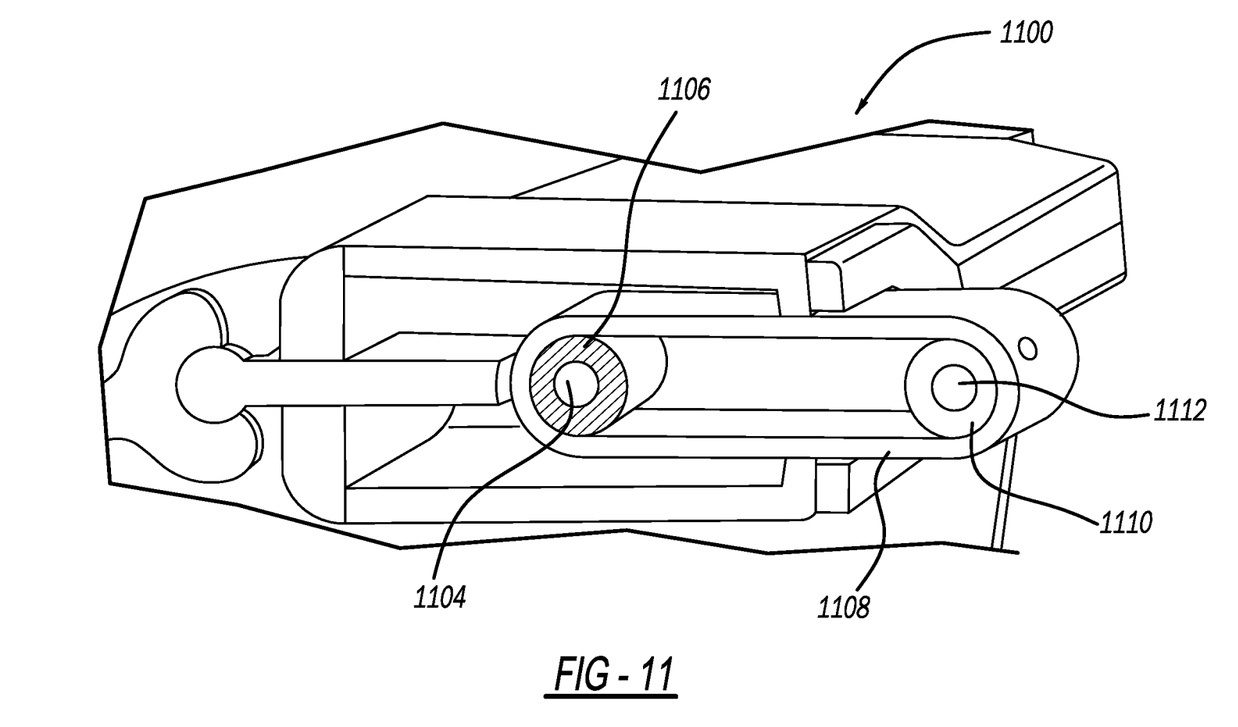
FIG. 11 is a cross-sectional perspective view of yet another exemplary air vent volume control system in accordance with the present disclosure.

FIG. 11 is a cross-sectional, close-up view of yet another exemplary air volume control system 1100 in accordance with the present disclosure. Similar to the exemplary embodiment described with reference to FIG. 10, a portion of the air vent volume control system 1100 extends forward from the primary vane 1102. In this manner, a user's fingers are not required to fit into the gap between the primary vane 110 and the air vent bezel/housing that surrounds the primary vane as illustrated in FIGS. 2A and 2B. The air vent volume control system 1100 includes a first pivot shaft 1104 that extends through the primary vane 1102 and connects to a volume control door (not shown) in a similar manner to that illustrated in described above. A first sleeve 1106 is slidably mounted on the first pivot shaft 1104 in a manner which permits the first sleeve 1106 to slide in a side-to-side direction together with the slider knob (not illustrated) and which permits the first sleeve 1106 to rotate together with the first pivot shaft 1104. The first sleeve 1106 engages a belt 1108 and the belt 1108 extends forward to engage a second sleeve 1110 which is pivotally mounted on a second pivot shaft 1112. In this manner, a user may engage the belt 1108 and rotate the belt 1108 around the second pivot shaft 1112 in order to rotate the volume control door (not shown) and thereby adjust the volume of air flowing through the air vent.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle air vent comprising:
   a volume control door pivotally mounted in a housing;
   a primary vane pivotally mounted in the housing to direct an air flow from an outlet of the vehicle air vent in an up/down direction;
   a roller knob mounted on the primary vane and connected to the volume control door such that a rotation of the roller knob causes a rotation of the volume control door; and
   a pivot shaft, wherein the pivot shaft is flexible, and wherein a first end of the pivot shaft rotates about a first axis and a second end of the pivot shaft rotates about a second axis that is offset from the first axis,
   wherein the roller knob is rotatable about the second axis and the second axis is offset further away from the volume control door than the first axis.

2. The vent of claim 1, wherein the roller knob is rotatable independently of the primary vane.

3. The vent of claim 1, wherein the volume control door is connected to a first gear shaft which includes a first set of gear teeth that engage a second set of gear teeth on a second gear shaft.

4. The vent of claim 3, wherein the second gear shaft connects to the pivot shaft that extends into the primary vane and connects to the roller knob.

5. The vent of claim 1, wherein the primary vane is pivotally mounted to rotate about the first axis.

6. The vent of claim 1, further comprising:
   a plurality of secondary vanes pivotal about a plurality of parallel vertical axes to direct an air flow from an outlet of the vehicle air vent in a side-to-side direction;
   a slider knob slidably mounted on the primary vane; and
   a slider fork connected to the slider knob and engaging the plurality of secondary vanes, wherein the roller knob is connected to the slider knob to slide in a side-to-side direction together with the slider knob on the primary vane.

7. The vent of claim 1, wherein the roller knob is rotatable independently of the primary vane, the volume control door is connected to a first gear shaft which includes a first set of gear teeth that engage a second set of gear teeth on a second gear shaft, the second gear shaft connects to the pivot shaft that extends into the primary vane and connects to the roller knob, and wherein the primary vane is pivotally mounted to rotate about the first axis.

8. The vent of claim 1, wherein the primary vane includes an upper primary portion and a lower primary portion.

9. The vent of claim 8, wherein the upper primary portion includes a primary shaft on which the roller knob is rotatably mounted.

10. A vehicle air vent comprising:
    a volume control door pivotally mounted in a housing;
    a primary vane pivotally mounted in the housing to direct an air flow from an outlet of the vehicle air vent in an up/down direction; and
    a roller knob mounted on the primary vane and connected to the volume control door such that a rotation of the roller knob causes a rotation of the volume control door, wherein the roller knob is rotatable independently of the primary vane, wherein the volume control door is connected to a first gear shaft which includes a first set of gear teeth that engage a second set of gear teeth on a second gear shaft, and wherein the second gear shaft connects to a pivot shaft that extends into the primary vane and connects to the roller knob,
    wherein a first end of the pivot shaft rotates about a first axis and a second end of the pivot shaft rotates about a second axis that is offset from the first axis, wherein the roller knob is rotatable about the second axis, wherein the second axis is offset further away from the volume control door than the first axis, and wherein the primary vane is pivotally mounted to rotate about the first axis.

11. The vent of claim 10, further comprising:
    a plurality of secondary vanes pivotal about a plurality of parallel vertical axes to direct an air flow from an outlet of the vehicle air vent in a side-to-side direction;
    a slider knob slidably mounted on the primary vane; and
    a slider fork connected to the slider knob and engaging the plurality of secondary vanes, wherein the roller knob is connected to the slider knob to slide in a side-to-side direction together with the slider knob on the primary vane.

12. The vent of claim 11, wherein the slider knob includes an upper slider portion and a lower slider portion which connect to each other around a portion of the primary vane.

13. The vent of claim 12, wherein each of the upper slider portion and the lower slider portion include arms which are positioned on each side of the roller knob.

* * * * *